United States Patent
Xu et al.

(10) Patent No.: US 12,496,711 B2
(45) Date of Patent: Dec. 16, 2025

(54) MULTI-LEGGED ROBOT LOAD BALANCING METHOD, MULTI-LEGGED ROBOT, AND STORAGE MEDIUM

(71) Applicant: UBTECH ROBOTICS CORP LTD, Shenzhen (CN)

(72) Inventors: Zhe Xu, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 204 days.

(21) Appl. No.: 18/200,417

(22) Filed: May 22, 2023

(65) Prior Publication Data
US 2023/0294281 A1    Sep. 21, 2023

Related U.S. Application Data

(63) Continuation of application No. PCT/CN2021/132995, filed on Nov. 25, 2021.

(30) Foreign Application Priority Data

Mar. 5, 2021  (CN) .......................... 202110247296.7

(51) Int. Cl.
| | |
|---|---|
| *B25J 9/16* | (2006.01) |
| *B25J 13/08* | (2006.01) |
| *B62D 57/032* | (2006.01) |

(52) U.S. Cl.
CPC .............. *B25J 9/163* (2013.01); *B25J 9/1607* (2013.01); *B25J 9/1633* (2013.01); *B25J 9/1656* (2013.01);
(Continued)

(58) Field of Classification Search
CPC ........ B25J 9/163; B25J 9/1607; B25J 9/1633; B25J 13/085; B25J 9/1656; B25J 9/1679; B25J 17/0258; B62D 57/02; B62D 57/032
See application file for complete search history.

(56) References Cited

U.S. PATENT DOCUMENTS

| | | | |
|---|---|---|---|
| 9,663,165 B1 * | 5/2017 | Blankespoor | B25J 9/162 |
| 2007/0016329 A1 * | 1/2007 | Herr | A61F 2/70 |
| | | | 700/250 |

(Continued)

FOREIGN PATENT DOCUMENTS

| | | | | |
|---|---|---|---|---|
| CN | 102749919 A | | 10/2012 | |
| CN | 110987132 A | * | 4/2020 | G01G 3/1402 |
| CN | 111070201 A | * | 4/2020 | B25J 9/1612 |

OTHER PUBLICATIONS

CN-110987132-A combined original and translation (Year: 2020).*
(Continued)

*Primary Examiner* — Kito R Robinson
*Assistant Examiner* — Zachary E. F. Glade

(57) ABSTRACT

A multi-legged robot load balancing method, a multi-legged robot, and a storage medium are provided. The method includes: calculating a current position and velocity of a load positioned on a torso according to a value measured by a force sensor; calculating, through a feedback control law, a desired posture of the torso required for keeping a balance of the load according to the current position and the current velocity of the load; determining an expected position of virtual joints according to the desired posture of the torso, and calculating, using a full dynamics control algorithm of the robot, a joint torque for each real joint of the robot according to the expected position; and transmitting the calculated joint torques to the corresponding real joints so
(Continued)

---

S121 — Construct a Lagrangian equation using a kinetic energy and potential energy equation satisfied by the position and the velocity of the load on the torso S122 — Obtain a linear relationship between the posture of the torso and an acceleration of the load by calculating a partial derivative of a position and velocity in the Lagrangian equation to obtain an equation to substitute into the Lagrangian equation S123 — Determine a linear feedback control law between the posture of the torso and the position and the velocity of the load based on the linear relationship that the torso is moved to reach the desired posture by moving the corresponding real joints.

20 Claims, 7 Drawing Sheets

(52) U.S. Cl.
CPC ........... *B25J 9/1679* (2013.01); *B25J 13/085* (2013.01); *B62D 57/032* (2013.01)

(56) References Cited

U.S. PATENT DOCUMENTS

| | | | | |
|---|---|---|---|---|
| 2009/0272585 | A1* | 11/2009 | Nagasaka | B25J 9/1633 74/490.03 |
| 2012/0310412 | A1* | 12/2012 | Seo | B25J 9/0006 700/254 |
| 2020/0331144 | A1* | 10/2020 | Huang | B25J 9/1664 |

OTHER PUBLICATIONS

CN-111070201-A combined original and translation (Year: 2020).*
ISR for PCT/CN2021/132995.
Written opinions of ISA for PCT/CN2021/132995.

* cited by examiner

MULTI-LEGGED ROBOT LOAD BALANCING METHOD, MULTI-LEGGED ROBOT, AND STORAGE MEDIUM

CROSS REFERENCE TO RELATED APPLICATIONS

The present disclosure is a continuation-application of International Application PCT/CN2021/132995, with an international filing date of Nov. 25, 2021, which claims foreign priority of Chinese Patent Application No. 202110247296.7, filed on Mar. 5, 2021 in the State Intellectual Property Office of China, the contents of all of which are hereby incorporated by reference.

BACKGROUND

1. Technical Field

The present disclosure relates to robot control technology, and particularly to a multi-legged robot load balancing method, a multi-legged robot, and a storage medium.

2. Description of Related Art

The technology related to the walking of multi-legged robots is relatively mature and can be applied in various fields such as logistics, inspection, and security. In the process of logistics transportation, a robot needs to place loads or goods on its torso, hence how to ensure the balance of the loads or goods on the torso has become an important issue. Taking quadruped robots as an example, most modern quadruped robots realize load balance by controlling the torso of the robot in an absolute horizontal state, rather than actively maintaining the position of a load by detecting the status of the load. Therefore, when the robot walks fast, the loads with poor stability (for example, balls, water bottles, and the like) tend to lose their balance and fall.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
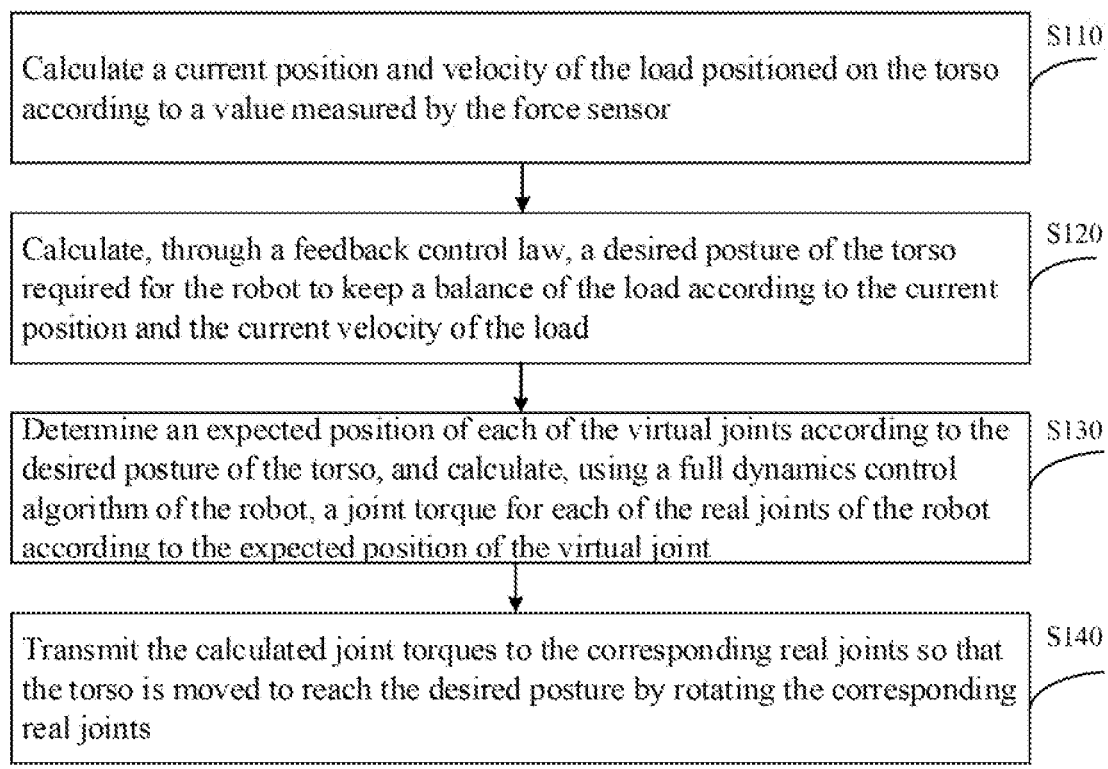
FIG. 1 is a flow chart of a multi-legged robot load balancing method according to an embodiment of the present disclosure.

The technical solutions in the embodiments of the present disclosure will be clearly and completely described below in conjunction with the drawings in the embodiments of the present disclosure.

The components of the embodiments of the present disclosure that are described and illustrated in the drawings herein may generally be arranged and designed in a variety of different configurations. Therefore, the following detailed description of the embodiments of the present disclosure provided in the drawings is not intended to limit the scope of the present disclosure, but merely represent the selected embodiments of the present disclosure. Based on the embodiments of the present disclosure, all other embodiments obtained by those of ordinary skill in the art without creative work fall within the protection scope of the present disclosure.

Taking logistics transportation as an example, a load to be transported is usually placed on a torso of a multi-legged robot. The current technology usually prevents the load from falling by controlling the torso to keep an absolute level, while it is difficult to ensure that the loads do not fall during the robot walks fast. Otherwise, in the scheme of actively balancing the load placed on the torso, the position and velocity of the load on the torso has to be measured first, then the robot needs to adjust the posture of the torso to maintain the position of the load, and finally the adjustment of the posture of the torso of the robot is realized by controlling each joint torque of the robot, thereby ensuring the balance of the load.

However, taking the measurement of the position and velocity of the load on the torso as an example, sometimes visual feedback technology is use to obtain point cloud information of the load, while its accuracy will be insufficient because the visual feedback is easily affected by the light and the surface material of the load. In addition, sometimes capacitive screen is used to feedback the position and velocity of the load, while it requires the surface of the load to be conductive and therefore has poor versatility. Consequently, the current technology cannot well solve the problem of active load balancing of multi-legged robots.

For resolving the above-mentioned problem, in the embodiments of the present disclosure, a multi-legged robot load balancing method is provided. By calculating a position and velocity of the load using the force sensor installed on the torso, a dynamics model of the position and velocity of the load and the posture of the torso is created to design a feedback control law, thereby controlling the position and velocity of the load by adjusting the posture of the torso. In addition, in order to achieve high-performance torso posture control, it is also realized by combining the full dynamics control principle of multi-legged robot, which can achieve a better control effect of the posture of the torso in comparison with the simplified model (for example, single rigid body, spring inverted pendulum, linear inverted pendulum, inverted pendulum, and the like) of the robot since the influence of the movement of the legs of the robot on the posture of the torso can be taken into account. Especially during the fast walking of the robot, although the fast movement of the legs will affect the torso much, the load balancing method as a kind of full dynamics control method can solve the above-mentioned problem to eventually achieve the object of load balancing.

The multi-legged robot load balancing method will be described below in combination with embodiments.

Embodiment 1

FIG. 1 is a flow chart of a multi-legged robot load balancing method according to an embodiment of the present disclosure. In this embodiment, a multi-legged robot load balancing method, that is, a load balancing method for a multi-legged robot is provided, which may be applied to various scenarios where the multi-legged robot is used for cargo transportation. The multi-legged robot may include a torso and a plurality of legs each coupled to the torso. Each of the legs has real joint(s) each moved by a corresponding joint motor, and has a foot with a sole. The load balancing method is a computer-implemented method executable for a processor of the multi-legged robot. In other embodiments, the method may be implemented through a quadruped robot shown in FIG. 2, or a multi-legged robot load balancing apparatus shown in FIG. 7. As shown in FIG. 1, in this embodiment, the method detects the state of a load placed on the torso in real time to performs active balancing, which not only has no requirement on the kind and shape of the load, but also ensures that the load will not fall even during the fast walking of the robot.

Figure 2:
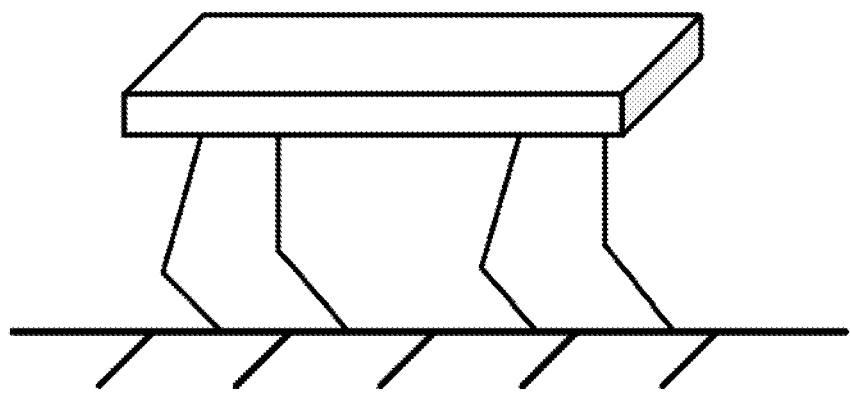
FIG. 2 is a schematic diagram of the structure of a quadruped robot according to an embodiment of the present disclosure.

In this embodiment, the multi-legged robot refers to a robot with at least three legs, for example, a three-legged robot, a quadruped robot, a hexapod robot, and the like. FIG. 2 is a schematic diagram of the structure of a quadruped robot according to an embodiment of the present disclosure. In this embodiment, a corresponding force sensor is disposed on the torso of the multi-legged robot so as to calculate, using the measuring results of the force sensor, the position and velocity of the load on the torso, thereby realizing the balance control of the load. As an example, the above-mentioned force sensor may be a six-dimensional force sensor or the like, where the six-dimensional force sensor can be used to measure three-dimensional (3D) force and three-dimensional torque.

In this embodiment, in order to use a full dynamics model of the multi-legged robot for load balance control, a plurality of virtual joints are constructed between the torso and an origin of a world coordinate system, thereby describing states of the torso through motions of the virtual joints in the world coordinate system. As an example, six serially connected virtual joints, which may be composed of three prismatic joints and three rotary joints, may be constructed between the torso and the origin of the world coordinate system.

In this embodiment, it should be understood that the virtual joints are different from the real joints of the multi-legged robot. The virtual joints which are not real joints can be regarded as equivalent joints of the multi-legged robot, while the real joints refer to the joints driven by joint motors. In addition, the virtual joint only generates motion, not force or torque. Since the multi-legged robot needs to move a good (that is, the load), the position of a base of the multi-legged robot in the world coordinate system is floating during the movement, and the base at this time is also called a floating base. The torso of the multi-legged robot is taken as the floating base here, so the base coordinate system of the robot is also called the torso coordinate system of the robot.

In this embodiment, as shown in FIG. 1, the multi-legged robot load balancing method may include the following steps.

S110: calculating a current position and velocity of the load positioned on the torso according to a value measured by the force sensor.

Figure 3:
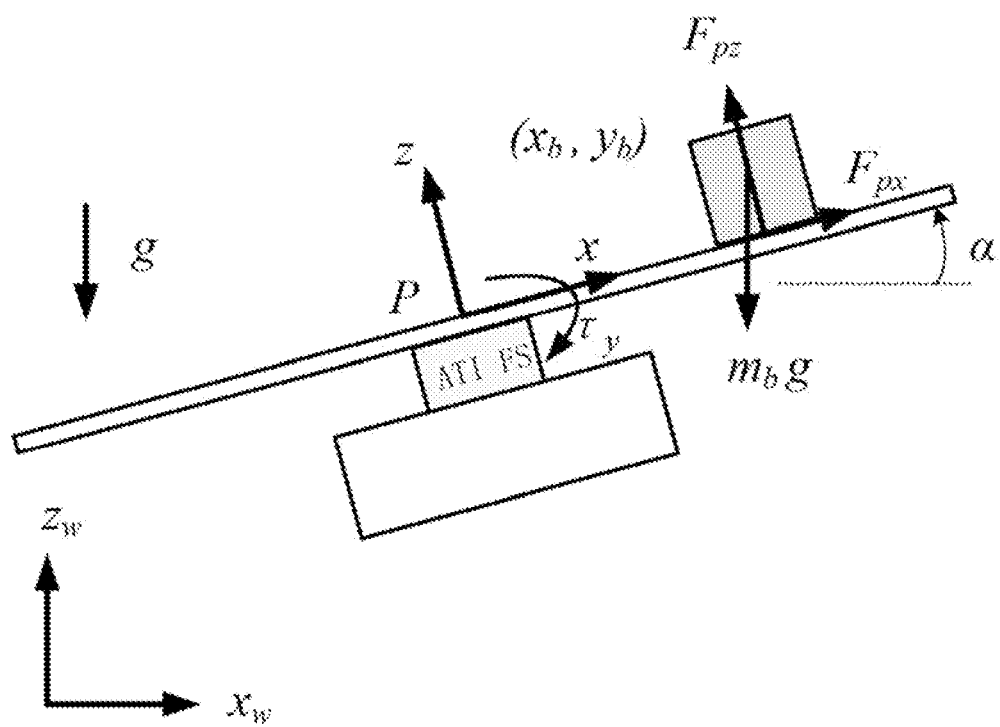
FIG. 3 is a schematic diagram of placing a load on a torso in the multi-legged robot load balancing method of FIG. 1.

In this embodiment, taking a six-dimensional force sensor called ATI FS (see FIG. 3) as an example, the six-dimensional force sensor ATI FS may be installed on the torso. FIG. 3 is a schematic diagram of placing a load on a torso in the multi-legged robot load balancing method of FIG. 1. As shown in FIG. 3, an end of the six-dimensional force sensor ATI FS is coupled to a plate (i.e., the strip in FIG. 3) for placing the load (i.e., the square in FIG. 3), and the other end of the six-dimensional force sensor ATI FS that is opposite to the above-mentioned end is coupled to the torso of the multi-legged robot. Therefore, a three-dimensional supporting force and a three-dimensional torque of the torso that act on the load in the torso coordinate system can be measured by the six-dimensional force sensor ATI FS.

For example, the three-dimensional supporting force may be expressed as $F_p = [F_{px}, F_{py}, F_{pz}]$, where $F_{px}$, $F_{py}$ and $F_{pz}$ are the supporting forces acting on the load in the x, y and z directions of the torso coordinate system, respectively; the three-dimensional torque may be expressed as $\tau_p = [\tau_x, \tau_y, \tau_z]$, where $\tau_x$, $\tau_y$ and $\tau_z$ are the torques acting on the load in the x, y, and z directions, respectively.

In this embodiment, for facilitating analysis and calculation, it is considered that the mass and inertia of the plate shown in FIG. 3 are small, for example, the mass of the plate may be much smaller than the mass of the load at several-folds, so it can be ignored in comparison with the impact of the load on the six-dimensional force sensor. At the same time, it is also considered that the thickness of the plate is small enough that the change of the torque of the six-dimensional force sensor caused by the supporting forces $F_{px}$ and $F_{py}$ can also be ignored. As shown in FIG. 3, the origin of the torso coordinate system is marked as point P, and the distance from the load on the x-y plane to point P can be expressed as $(x_b, y_b)$.

For the above-mentioned step S110, after measuring, through the disposed force sensor, the supporting force and torque of the torso that act on the load, the current position of the load on the plate may be calculated according to corresponding equations, and the current velocity of the load may be obtained by deriving the calculated position.

In which, the equations may be stored by the robot in advance, or be input by the user in advance. As an example, the equations may be:

$$x_b = \frac{\tau_y}{F_{pz}}; \text{ and } y_b = \frac{\tau_x}{F_{pz}};$$

where, $(x_b, y_b)$ represent the coordinate of the position of the load on the x-y plane in the torso coordinate system, $\tau_x$ and $\tau_y$ represent the torques acting on the load in the x-axis and y-axis directions of the torso coordinate system, respectively; and $F_{pz}$ represents the supporting force of the torso acting on the load in the z-axis direction of the torso coordinate system.

S120: calculating, through a feedback control law, a desired posture of the torso required for the robot to keep a balance of the load according to the current position and the current velocity of the load.

In this embodiment, after calculating the current position and the current velocity of the load, in order to keep it on the torso from falling, the posture of the torso that is required for the load to keep balance, that is, the above-mentioned desired posture will be solved using a pre-designed feedback control law. Then, the joint torque required by each real joint when the torso of the multi-legged robot reaches the desired posture may be calculated through a full dynamics control method of the robot.

Figure 4:
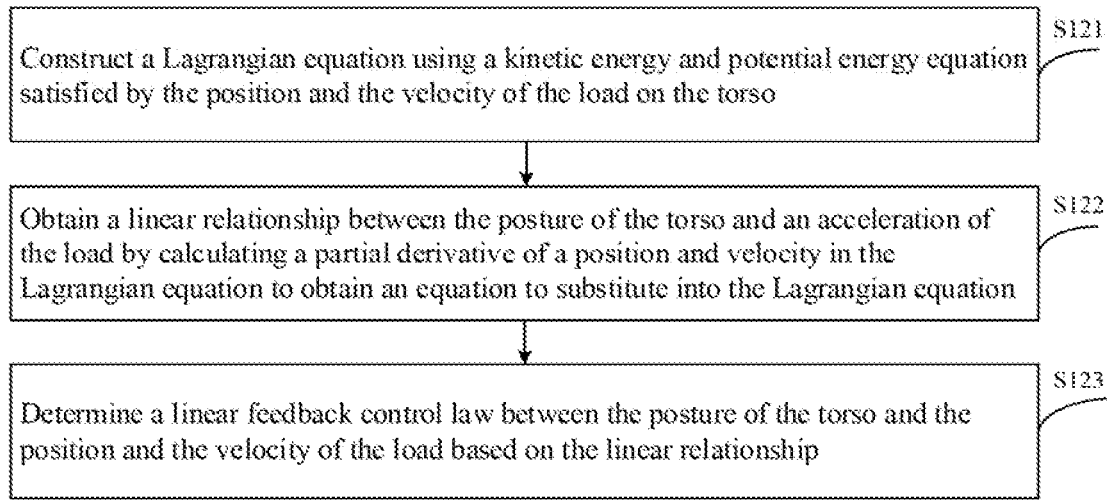
FIG. 4 is a flow chart of constructing a feedback control law in the multi-legged robot load balancing method of FIG. 1.

In which, the feedback control law may be constructed by the user in advance according to actual needs and stored in a controller of the multi-legged robot. FIG. 4 is a flow chart of constructing a feedback control law in the multi-legged robot load balancing method of FIG. 1. As shown in FIG. 4, in this embodiment, the process of constructing the feedback control law may include the following steps.

S121: constructing a Lagrangian equation using a kinetic energy and potential energy equation satisfied by the position and the velocity of the load on the torso.

In this embodiment, in order to solve the relationship between the posture of the torso of the robot and the position and velocity of the load, a Lagrangian equation may be used to solve the dynamics equation of the full dynamics model. For example, the kinetic energy equation and potential energy equation that the load satisfies on the torso may be constructed first as:

$$T = \tfrac{1}{2} m_b (\dot{x}_b^2 + \dot{y}_b^2); \text{ and}$$

$$P = m_b g(-x_b \sin\alpha + y_b \cos\alpha \sin\beta);$$

where, T is the kinetic energy, P is the potential energy; $m_b$ is the mass of the load, g is the acceleration of gravity; $x_b$ and $y_b$ represent the position of the load on the torso, $\dot{x}_b$ and $\dot{y}_b$ represent the velocity of the load on the torso; and $\alpha$ and $\beta$ represent the posture of the torso. In which, $\alpha$ is the included angle between the torso and the X-Z plane in the torso coordinate system, and $\beta$ is the included angle between the torso and the y-z plane. Then, the Lagrange equation may be:

$$L = T - P = \tfrac{1}{2} m_b (\dot{x}_b^2 + \dot{y}_b^2) - m_b g(-x_b \sin\alpha + y_b \cos\alpha \sin\beta).$$

S122: obtaining a linear relationship between the posture of the torso and an acceleration of the load by calculating a partial derivative of a position and velocity in the Lagrangian equation to obtain an equation to substitute into the Lagrangian equation.

Generally, if the friction between the load and the plate is large, it will be difficult for the load to slide, and there is no need to actively control the load at a balanced position. Therefore, in this embodiment, in order to resolve the above-mentioned problem in extreme cases, it is assumed that there is no friction between the load and the panel, and the position of the load on the torso can only be controlled by adjusting the posture of the torso. Therefore, a corresponding equation may be obtained by calculating the partial derivative of the position and velocity in the above-mentioned Lagrangian equation, and then the relationship between the posture of the torso and the acceleration of the load may be deduced by using the equation.

In this embodiment, assuming that $q = [x_b, y_b]$, and q represents the position. If the position of the load on the torso can only be controlled by adjusting the posture of the torso, the above-mentioned Lagrangian equation will satisfy:

$$\frac{d}{dt}\frac{\partial L}{\partial \dot{q}} - \frac{\partial L}{\partial q} = 0.$$

Therefore, it can be calculated as equations of:

$$m_b \ddot{x}_b - m_b g \sin\alpha = 0; \text{ and}$$

$$m_b \ddot{y}_b + m_b g \cos\alpha \sin\beta = 0;$$

Then, when both $\alpha$ and $\beta$ are close to zero, the linear relationship may be obtained as equations of:

$$\ddot{x}_b - g\alpha = 0; \text{ and}$$

$$\ddot{y}_b + g\beta = 0.$$

S123: determining a linear feedback control law between the posture of the torso and the position and the velocity of the load based on the linear relationship.

In this embodiment, when the current position and velocity of the load, and the expected position and velocity when the load is balanced on the torso are known, the desired posture of the torso may be calculated through the feedback control law. Through the above-mentioned linear relationship, the corresponding linear feedback control law may be designed as equations of:

$$\alpha = K_p(x_{b_{ref}} - x_b) + K_d(\dot{x}_{b_{ref}} - \dot{x}_b); \text{ and}$$

$$\beta = -K_p(y_{b_{ref}} - y_b) + K_d(\dot{y}_{b_{ref}} - \dot{y}_b);$$

where, $\alpha$ and $\beta$ represent the postures of the torso in different directions, $x_{b_{ref}}$ and $y_{b_{ref}}$ represent the expected position of the load on the torso, $\dot{x}_{b_{ref}}$ and $\dot{y}_{b_{ref}}$ represent the expected velocity of the load on the torso; $x_b$ and $y_b$ represent the current position of the load on the torso, and $\dot{x}_b$ and $\dot{y}_b$ represent the current velocity of the load on the torso; and $K_p$ are $K_d$ proportional coefficients which can be set in advance according to actual needs.

S130: determining an expected position of each of the virtual joints according to the desired posture of the torso, and calculating, using a full dynamics control algorithm of the robot, a joint torque for each of the real joints of the robot according to the expected position of the virtual joint.

In this embodiment, the desired posture of the torso may be represented by the expected positions of the above-mentioned virtual joints that are constructed in advance, and the expected velocity and the expected acceleration of the corresponding virtual joint may be calculated by solving the first derivative and the second derivative on the expected position of the virtual joint, respectively.

Then, based on the expected position, expected velocity and expected acceleration of each virtual joint, the optimization model with the acceleration of the general joints and the sole forces as the optimization variables may be solved to obtain the optimal solution, and finally the optimal solution may be substituted into the dynamics equation satisfied by the real joints of the multi-legged robot so as to solve the joint torques required by each real joint. The sole force is the force upon the undersurface of a foot of the robot.

The above-mentioned optimization model and its corresponding constraint may be constructed in advance and stored in the controller. For example, if the standard quadratic optimization function is used for construction, the optimization model at this time may be expressed as equations of:

$$\min_X \frac{1}{2} X^T H X + X^T h; \text{ and}$$
$$s.t. \text{ lb} \leq CX \leq ub;$$

where, H and h are intermediate variables, $H=A^T A$, $h=-A^T b$, A and b are the coefficient matrices of the optimization model; X is the optimization variable; and C represents the constraint matrix, and lb and ub represent the upper bound and lower bound of constraint, respectively. It should be noted that the above-mentioned standard quadratic optimization function is only an example of the equation of the optimization model, and it may also use other forms of quadratic optimization functions that can solve the joint torque required by each real joint using the expected motion state of the torso.

In this embodiment, the optimization variable X will be determined based on the full dynamics equation of the robot. For example, one multi-legged robot may include a plurality of virtual joints and real joints, where the state of the floating base may be represented by the virtual joints, so the full dynamics equation of the multi-legged robot may be as an equation of:

$$M(q) \begin{bmatrix} \ddot{q}_f \\ \ddot{q}_j \end{bmatrix} + D(q, \dot{q}) = \begin{bmatrix} 0 \\ \tau_j \end{bmatrix} + J^T(q) F;$$

where, q, $\dot{q}$, and $\ddot{q}$ represent the position, the velocity, and the acceleration of the generalized joints of the multi-legged robot, respectively, and the generalized joints include the virtual joints and real joints. In which, the acceleration $\ddot{q}$ is composed of the acceleration $\ddot{q}_f$ of the virtual joint corresponding to the floating base and the acceleration $\ddot{q}_j$ of the real joint. M(q) represents the inertia matrix of the multi-legged robot; D(q, $\dot{q}$) represents the nonlinear vector which is composed of Coriolis force and centrifugal force item, and gravity item; J(q) represents the Jacobian matrix of the multi-legged robot; F represents the external force acting on the multi-legged robot; and $\tau_j$ represents the joint torques generated by all the real joints. It can be understood that virtual joints do not generate torque, so the corresponding item is a zero vector.

Taking one quadruped robot as an example, there are six virtual joints corresponding to its floating base, and twelve real joints corresponding to its four legs. Therefore, the dimensions of each item in the above-mentioned full dynamics equation will be: $M \in R^{18 \times 18}$, $D \in R^{18 \times 1}$, $\ddot{q}_f \in R^{6 \times 1}$, $\ddot{q}_j \in R^{12 \times 1}$, $\tau \in R^{18 \times 1} = [0_{6 \times 1} \tau_j] T$, $\tau_j \in R^{12 \times 1}$, $J \in R^{18 \times 18}$, $F \in R^{12 \times 1}$.

In this embodiment, from the above-mentioned full dynamics equation, the acceleration $\ddot{q}$ of the general joints and the sole force F of the multi-legged robot may be selected as the optimization variable X which may be expressed as $$X = \begin{bmatrix} \ddot{q} \\ F \end{bmatrix},$$

where the acceleration $\ddot{q}$ of the general joints may include the acceleration $\ddot{q}_f$ of all the virtual joints and the acceleration $\ddot{q}_j$ of the real joints.

In this embodiment, the parameters of A and b may be determined according to a posture control task of the torso. In one embodiment, in order to determine the coefficient matrix in the above-mentioned optimization model, the posture control task of the torso will be constructed in a control system of the robot in advance. For example, the six-dimensional state control of the torso may be described as making the actual acceleration $\ddot{q}_f$ of the torso equal to the expected acceleration $\ddot{q}^*_f$ as much as possible, that is, $\ddot{q}_f = \ddot{q}^*_f$.

Since the expected acceleration $\ddot{q}^*_f$ of the torso is realized by the controller of the torso, if a PD controller is used as the controller for control, then:

$$\ddot{q}_{fFB} = K_{p_0}(q_{fTar} - q_{fFB}) + K_{d_0}(\dot{q}_{fTar} - \dot{q}_{fFB}); \text{ and}$$
$$\ddot{q}^*_f = \ddot{q}_{fTar} + \ddot{q}_{fFB};$$

where, $K_{p_0}$ and $K_{d_0}$ are the coefficient matrices of the controller; $q_{fTar}$ and $q_{fFB}$ are the expected position of the torso and its actual feedback position; $\dot{q}_{fTar}$ and $\dot{q}_{fFB}$ are the expected velocity of the torso and its actual feedback velocity; $\ddot{q}_{fFB}$ is the acceleration feedback amount of the torso calculated by the controller; and $\ddot{q}_{fTar}$ is the acceleration feed-forward amount of the torso planned by the controller.

Therefore, for the above-mentioned task $\ddot{q}_f = \ddot{q}^*_f$, it may be described in the form of AX=b, that is:

$$A = A_0 = [I_6 0_{6 \times 24}]; \text{ and}$$

$$b = b_0 = \ddot{q}^*_f.$$

In addition, for the constraints of the optimization model, as an example, the constraints of the optimization model may mainly include a dynamics equation satisfied by the acceleration of the general joints and the sole forces, a friction cone constraint inequality of the sole forces, and a constraint inequality of the joint torque of the real joints, and the like.

In this embodiment, the constraints may include an equality constraint and an inequality constraint, which may be expressed as equations of:

$$lb_e \leq C_e X \leq ub_e; \text{ and}$$

$$lb_r \leq C_r X \leq ub_r;$$

where, $C_e$ and $C_r$ represent the equality constraint matrix and the inequality constraint matrix, respectively, $lb_e$ and $ub_e$ represent the lower bound and upper bound of equality constraint, respectively, and $lb_r$ and $ub_r$ represent the lower bound and upper bound of inequality constraint, respectively. In this embodiment, $C_e$, $lb_e$ and $ub_e$ in the above-mentioned equality constraint will be determined according to the dynamics equations satisfied by the acceleration of the general joints and the sole forces, while $C_{r1}$, $lb_{r1}$ and $ub_{r1}$ in the above-mentioned inequality constraint may be determined according to the friction cone constraint inequality of the sole forces, and $C_{r2}$, $lb_{r2}$ and $ub_{r2}$ may be determined according to the constraint inequality of the joint torque of the real joints.

In one embodiment, the friction cone constraint inequality of the sole forces may be constructed mainly by constructing the constraints of the sole forces of the supporting leg and the swinging leg of the multi-legged robot, respectively.

Figure 5:
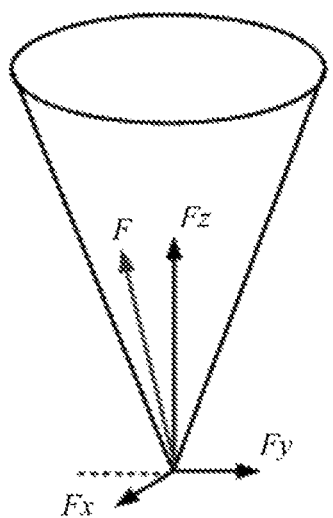
FIG. 5 is a schematic diagram of analyzing a friction cone constraint of a sole force in the multi-legged robot load balancing method of FIG. 1.

Taking one supporting leg as an example, since it needs to keep the supporting leg from sliding relative to the external contact surface (for example, the ground, or the like), the sole force of the supporting leg needs to satisfy the friction cone constraint, that is, the vector direction of the sole force needs to be within a cone. FIG. 5 is a schematic diagram of analyzing a friction cone constraint of a sole force in the multi-legged robot load balancing method of FIG. 1. As shown in FIG. 5, for two other directions perpendicular to the gravity direction, if the two directions are the x direction and the y direction, the friction cone constraints should be satisfied as equations of:

$$|F_x| \leq \mu F_z; \text{ and}$$

$$|F_y| \leq \mu F_z;$$

where, $F_x$, $F_y$ and $F_z$ are the external forces received in the x, y and z directions, respectively, and the z direction coincides with the gravity direction; and $\mu$ is the friction coefficient.

In addition, since the external contact surface can only provide supporting force but not pull force, it is possible to construct a supporting force constriction of the sole force of the supporting leg of the multi-legged robot in the gravity direction, which may be expressed as an equation of:

$$-\infty \leq F_z \leq 0;$$

where, $\infty$ is the constraint coefficient of the friction cone, and can be stored in advance by the controller or be set in advance by the user.

For the supporting legs, the corresponding inequality constraint matrix may be constructed based on the above-mentioned constraints. Similarly, for the swinging leg, since the sole forces of the swinging leg is zero in the gravity direction and the two other directions, if three inequality constraints are used for description, then:

$$0 \leq F_x \leq 0;$$

$$0 \leq F_y \leq 0; \text{ and}$$

$$0 \leq F_z \leq 0.$$

However, since the form of the inequality constraint is constantly changing during the optimization s, in order to ensure that the dimension and form of the inequality constraint have nothing to do with the state of the supporting leg and the swinging leg, the inequality constraint of the swinging leg may be designed as equations of:

$$-\infty \leq -F_y - \mu F_z \leq 0;$$

$$-\infty \leq -F_x - \mu F_z \leq 0;$$

$$0 \leq F_x - \mu F_z \leq +\infty;$$

$$0 \leq F_y - \mu F_z \leq +\infty; \text{ and}$$

$$0 \leq F_y - \mu F_z \leq +\infty.$$

Since both the supporting leg and the swinging leg have five inequality constraints, they can be described by a general inequality constraint matrix. During walking, the current state of each leg may be determined according to a state machine of the multi-legged robot, so as to select the corresponding upper bound and lower bound vectors to construct the above-mentioned inequality constraint of the sole forces.

Figure 6:
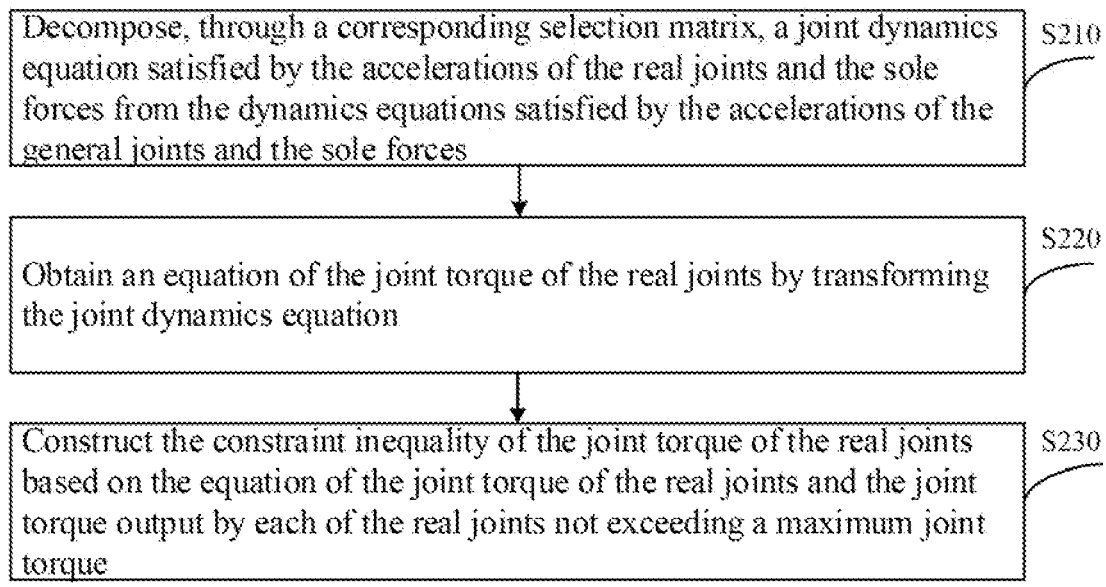
FIG. 6 is a flow chart of constructing a constraint inequality of a joint torque in the multi-legged robot load balancing method of FIG. 1.

FIG. 6 is a flow chart of constructing a constraint inequality of a joint torque in the multi-legged robot load balancing method of FIG. 1. As shown in FIG. 6, in one embodiment, the construction of the constraint inequality of the joint torque of the above-mentioned real joint may include the following steps.

S210: decomposing, through a corresponding selection matrix, a joint dynamics equation satisfied by the accelerations of the real joints and the sole forces from the dynamics equations satisfied by the accelerations of the general joints and the sole forces.

S220: obtaining an equation of the joint torque of the real joints by transforming the joint dynamics equation.

S230: constructing the constraint inequality of the joint torque of the real joints based on the equation of the joint torque of the real joints and the joint torque output by each of the real joints not exceeding a maximum joint torque.

Since the virtual joints do not generate torques, the full dynamics equation of the multi-legged robot may be decomposed through the corresponding selection matrix to obtain a dynamics equation satisfied by the accelerations of the virtual joints and the sole forces, and a dynamics equation satisfied by the accelerations of the real joints and the sole forces.

Still taking the above-mentioned quadruped robot as an example, if the degree of freedom of the virtual joint is six, the first six rows of a selection matrix $S_6 \in R^{6 \times 18} = [I_{6 \times 6} 0_{6 \times 12}]$ may be selected, then the dynamic equation satisfied by each virtual joint may be:

$$S_6 M \ddot{q} + S_6 D = 0 + S_6 J^T F.$$

If it needs to take the last twelve rows, a selection matrix $S_{12} \in R^{12 \times 18} = [0_{12 \times 6} I_{12 \times 12}]$ may be used to obtain the dynamics equation satisfied by each real joint as:

$$S_{12} M \ddot{q} + S_{12} D = \tau_j + S_{12} J^T F.$$

If the maximum joint torque is $\tau_m$, then:

$$-\tau_m \leq \tau_j = S_{12} M \ddot{q} - S_{12} J^T F + S_{12} D \leq \tau_m.$$

By arranging the above-mentioned inequality, the above-mentioned constraint inequality of the joint torques of the real joints may be obtained.

Therefore, by combining the above-mentioned equality constraint and inequality constraint with the above-mentioned optimization model to solve the optimization variable, an optimal solution which includes the acceleration $\ddot{q}_{opt}$ of the general joints and the sole forces $F_{opt}$ can be obtained. Then, by substituting the obtained value into the above-mentioned dynamics equation satisfied by the acceleration of the real joints and the sole forces, the joint torque $\tau_{jopt}$ required by each real joint may be obtained as an equation of:

$$\tau_{jopt} = S_{12} M \ddot{q}_{opt} - S_{12} J^T F_{opt} + S_{12} D.$$

S140: transmitting the calculated joint torques to the corresponding real joints so that the torso is moved to reach the desired posture by rotating the corresponding real joints.

In this embodiment, the calculated joint torque $\tau_{jopt}$ may be transmitted to an actuator of each real joint so that the joint outputs the torque $\tau_{jopt}$ through the corresponding joint motor. In such manner, the torso of the multi-legged robot can reach the above-mentioned desired posture, thereby controlling the position and velocity of the load.

In this embodiment, a method that can actively balance the load placed on the torso is provided, which can better ensure that the load on the torso can be at the expected position and velocity compared with the existing method that only ensures the level of the torso, and has a very positive role in promoting the application of multi-legged robots in the field of logistics and transportation. In the process of transporting loads, by just placing the load near the expected position rather than fixing the load, the robot can actively control the position and velocity of the load and ensure the balance of the load on the torso during the fast walking of the multi-legged robot. In addition, by calculating, through the force sensor, the position and velocity of the load on the torso in a feedback manner, there will be almost no requirements for the kind of load and therefore has better robustness.

Embodiment 2

Figure 7:
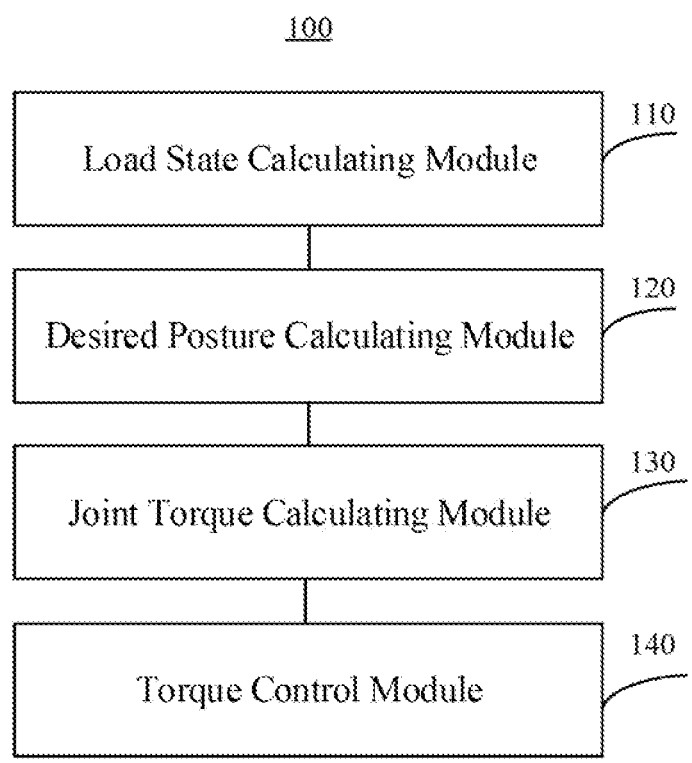
FIG. 7 is a schematic block diagram of the structure of a multi-legged robot load balancing apparatus according to an embodiment of the present disclosure.

FIG. 7 is a schematic block diagram of the structure of a multi-legged robot load balancing apparatus according to an embodiment of the present disclosure. As shown in FIG. 7, in this embodiment, a load balancing apparatus 100 for the above-mentioned multi-legged robot (e.g., the quadruped robot of FIG. 2) is proved based on the method of the above-mentioned Embodiment 1. In which, the torso of the multi-legged robot is provided with the force sensor, and the state of the torso is represented through motions of the plurality of virtual joints constructed between the torso and the origin of the world coordinate system.

In this embodiment, the load balancing apparatus 100 for the multi-legged robot may include:
  a load state calculating module 110 configured to calculate a current position and velocity of a load positioned on the torso according to a value measured by the force sensor;
  a desired posture calculating module 120 configured to calculate, through a feedback control law, a desired posture of the torso required for the robot to keep a balance of the load according to the current position and the current velocity of the load;
  a joint torque calculating module 130 configured to determine an expected position of the virtual joints according to the desired posture of the torso, and calculating, using a full dynamics control algorithm of the robot, a joint torque for each of the real joints of the robot according to the expected position of the virtual joints; and
  a torque control module 140 configured to transmit the calculated joint torques to the corresponding real joints so that the torso is moved to reach the desired posture by rotating the corresponding real joints.

It should be noted that the apparatus in this embodiment corresponds to the method in the above-mentioned Embodiment 1, and the optional features in the above-mentioned Embodiment 1 are also applicable to this embodiment, therefore will not be described herein.

The present disclosure further provides a multi-legged robot (e.g., the quadruped robot of FIG. 2). In this embodiment, the multi-legged robot may include a processor and a storage, where the storage stores computer program(s), and the processor executes the computer program so that the multi-legged robot performs the above-mentioned method or the function of each module in the above-mentioned apparatus.

The present disclosure further provides a non-transitory computer-readable storage medium for storing the above-mentioned computer program(s) used in the above-mentioned multi-legged robot.

In the embodiments of the present disclosure, it should be understood that the disclosed method and apparatus may be implemented in other manners. The above-mentioned apparatus embodiment is merely illustrative, for example, the flow charts and structural diagrams in the drawings show the architecture, functions and operations that are possible to be implemented by the apparatus, method and computer program products of the embodiments. In this regard, each block in the flowchart or block diagram may represent a module, a program segment, or a part of codes that include one or more computer executable instructions for implementing specified logical functions. It should also be noted that, in alternative implementations, the functions noted in the blocks may occur out of the order noted in the figures. For example, two blocks in succession may, in fact, be executed substantially concurrently, or may sometimes be executed in the reverse order, depending upon the functionality involved. It is also to be noted that each block in the block diagrams and/or flow charts, and the combination of blocks in the block diagrams and/or flow charts, may be implemented by a dedicated hardware-based system for performing the specified function or action, or may be implemented by a combination of special purpose hardware and computer instructions.

In addition, each functional module or unit in each embodiment of the present disclosure may be integrated to form an independent part, each module or unit may exist independently, or two or more modules or units may be integrated to form an independent part.

The functions can be stored in a computer readable storage medium if it is implemented in the form of a software functional unit and sold or utilized as a separate product. Based on this understanding, the technical solution of the present disclosure, either essentially or in part, contributes to the prior art, or a part of the technical solution can be embodied in the form of a software product. The software product is stored in a storage medium, which includes a number of instructions for enabling a computer device (which can be a smart phone, a personal computer, a server, a network device, etc.) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The forgoing is only the specific embodiment of the present disclosure, while the scope of the present disclosure is not limited thereto. For those skilled in the art, modifications or replacements that can be easily conceived within the technical scope of the present disclosure should be included within the scope of the present disclosure.

What is claimed is:

1. A computer-implemented load balancing method for a multi-legged robot with a processor, a torso and a plurality of legs each coupling to the torso and having one or more real joints, wherein a force sensor is disposed on the torso, and states of the torso are described by motions of a plurality of virtual joints constructed between the torso and an origin of a world coordinate system; wherein the method comprises:
  calculating, by the processor, a current position and a current velocity of a load positioned on the torso according to a value measured by the force sensor, wherein the value measured by the force sensor comprises supporting force and torque of the torso that act on the load;
  calculating, by the processor using a feedback control law, a desired posture of the torso required for the robot to keep a balance of the load according to the current position and the current velocity of the load, wherein the feedback control law is constructed by: using a Lagrangian equation satisfied by the load on the torso to solve a relationship between a posture of the torso and an acceleration of the load;

determining, by the processor, an expected position of the virtual joints according to the desired posture of the torso, and calculating, using a full dynamics control algorithm of the robot, a joint torque for each of the real joints of the robot according to the expected position of the virtual joints; and transmitting, by the processor, the calculated joint torques to actuators of the corresponding real joints, and controlling, by the actuators of the corresponding real joints, the corresponding real joints to move according to the calculated joint torque, so that the torso is moved to reach the desired posture.

2. The method of claim 1, wherein the multi-legged robot has at least three legs, an end of the force sensor is coupled to a plate for placing the load, and an opposite end of the force sensor is coupled to the torso of the robot, and the calculating the current position and the current velocity of the load positioned on the torso according to the value measured by the force sensor comprises:

calculating, through a corresponding equation, the current position of the load on the plate according to a supporting force and torque exerted on the load by the torso measured by the force sensor, and obtaining the current velocity of the load by differentiating the current position; wherein the equation is:

$$x_b = \frac{\tau_y}{F_{pz}}; \text{ and}$$

$$y_b = \frac{\tau_x}{F_{pz}};$$

where, $(x_b, y_b)$ represents a position coordinate of the load on an x-y plane of a torso coordinate system, and $\tau_x$ represents a torque exerted on the load in an x-axis direction of the torso coordinate system, $\tau_y$ represents a torque exerted on the load in a y-axis direction of the torso coordinate system, and $F_{pz}$ represents the supporting force exerted on the load in a z-axis direction of the torso coordinate system.

3. The method of claim 1, wherein the feedback control law is constructed by:

constructing the Lagrangian equation using a kinetic energy and potential energy equation satisfied by the position and the velocity of the load on the torso;

obtaining a linear relationship between the posture of the torso and an acceleration of the load by calculating a partial derivative of a position and velocity in the Lagrangian equation to obtain an equation to substitute into the Lagrangian equation; and determining a linear feedback control law between the posture of the torso and the position and the velocity of the load based on the linear relationship.

4. The method of claim 1, wherein the feedback control law includes equations of:

$$\alpha = K_p(x_{b_{ref}} - x_b) + K_d(\dot{x}_{b_{ref}} - \dot{x}_b); \text{ and}$$

$$\beta = -K_p(y_{b_{ref}} - y_b) + K_d(\dot{y}_{b_{ref}} - \dot{y}_b);$$

where, $\alpha$ and $\beta$ represent the posture of the torso, $\alpha$ is an included angle between the torso and an x-z plane in the torso coordinate system, and $\beta$ is an included angle between the torso and a y-z plane in the torso coordinate system; $x_{b_{ref}}$ and $y_{b_{ref}}$ represent expected positions of the load on the torso, and $\dot{x}_{b_{ref}}$ and $\dot{y}_{b_{ref}}$ represent expected velocities of the load on the torso; $x_b$ and $y_b$ represent a current position of the load on the torso, and $\dot{x}_b$ and $\dot{y}_b$ represent a current velocity of the load on the torso; and $K_p$ and $K_d$ are preset ratio coefficients.

5. The method of claim 1, wherein the determining the expected position of the virtual joints according to the desired posture of the torso, and calculating, using the full dynamics control algorithm of the robot, the joint torque for each of the real joints of the robot according to the expected position of the virtual joints comprises:

calculating an expected velocity and expected acceleration of each of the virtual joints based on the expected position of the virtual joint;

obtaining an optimal solution by solving an optimization model with accelerations of generalized joints of the robot and sole forces of the legs of the robot as optimization variables based on the expected position, the expected velocity and the expected acceleration of each of the virtual joints, wherein constraints of the optimization model include a dynamics equation satisfied by the accelerations of the generalized joints and the sole forces, a friction cone constraint inequality of the sole forces, and a constraint inequality of the joint torque of the real joints, wherein the sole force is a force upon an undersurface of a foot of the robot; and solving the joint torque for each of the real joints according to the optimal solution and a dynamics equation satisfied by the real joint.

6. The method of claim 5, wherein the generalized joints include the virtual joints and the real joints, and the torso is taken as a floating base of the robot, and the dynamics equations satisfied by the accelerations of the generalized joints and the sole forces includes:

a dynamics equation satisfied by the accelerations of the virtual joints and the sole forces, and a dynamics equation satisfied by the accelerations of the real joints and the sole forces.

7. The method of claim 5, wherein the friction cone constraint inequality of the sole forces is constructed by:

constructing a supporting force constriction of the sole force of a supporting leg among the legs of the robot in a gravity direction and friction cone constraints of the sole forces of the supporting leg in two other directions perpendicular to the gravity direction;

describing the sole force of a swinging leg among the legs of the robot as zero in the gravity direction and in the two other directions by means of inequality constraints; and constructing the friction cone constraint inequality of the sole forces based on the supporting force constriction and the friction cone constraint of the supporting leg and an equation constraint of the swinging leg.

8. The method of claim 5, wherein the constraint inequality of the joint torque of the real joints is constructed by:
decomposing, through a corresponding selection matrix, a joint dynamics equation satisfied by the accelerations of the real joints and the sole forces from the dynamics equations satisfied by the accelerations of the general joints and the sole forces;
obtaining an equation of the joint torque of the real joints by transforming the joint dynamics equation; and
constructing the constraint inequality of the joint torque of the real joints based on the equation of the joint torque of the real joints and the joint torque output by each of the real joints not exceeding a maximum joint torque.

9. The method of claim 5,
wherein the optimization model is constructed using a standard type quadratic optimization function, and the optimization model is as equations of:

$$\min_X \frac{1}{2} X^T H X + X^T h; \text{ and}$$
$$s.t. \; lb \leq CX \leq ub;$$

wherein, $H = A^T A;$ $h = -A^T b;$ $C = \begin{bmatrix} C_e \\ C_r \end{bmatrix}, \text{ where } C_r = \begin{bmatrix} C_{r1} \\ C_{r2} \end{bmatrix};$ $lb = \begin{bmatrix} lb_e \\ lb_r \end{bmatrix}, \text{ where } lb_r = \begin{bmatrix} lb_{r1} \\ lb_{r2} \end{bmatrix}; \text{ and}$ $ub = \begin{bmatrix} ub_e \\ ub_r \end{bmatrix}, \text{ where } ub_r = \begin{bmatrix} ub_{r1} \\ ub_{r2} \end{bmatrix};$ where, A and b are coefficient matrices of the optimization model that are determined by a task of the robot for controlling the posture of the torso;
H and h are intermediate variables; X is the optimization variable composed of the accelerations of the general joints and the sole forces; C represents a constraint matrix, $C_e$ represents an equality constraint matrix, and $C_r$ represents an inequality constraint matrix; lb represents a lower bound of constraint, ub represents an upper bound of constraint, $lb_e$ represents a lower bound of equality constraint, $ub_e$ represents an upper bound of equality constraint, $lb_r$ represents a lower bound of inequality constraint, and $ub_r$ represents an upper bound of inequality constraint; and $C_e$, $lb_e$ and $ub_e$ are determined according to the dynamics equation satisfied by the accelerations of the general joints and the sole forces, $C_{r1}$, $lb_{r1}$ and $ub_{r2}$, are determined according to the friction cone constraint inequality of the sole forces, and $C_{r2}$, $lb_{r2}$ and $ub_{r2}$ are determined according to the constraint inequality of the joint torque of the real joints.

10. A multi-legged robot, comprising:
a torso;
a plurality of legs each coupling to the torso and having one or more real joints, wherein a force sensor is disposed on the torso, and states of the torso are described by motions of a plurality of virtual joints constructed between the torso and an origin of a world coordinate system;
a processor;
a memory comprising a non-transitory computer-readable medium coupled to the processor; and
one or more computer programs stored in the memory and executable on the processor; wherein, the one or more computer programs comprise:
instructions for calculating a current position and a current velocity of a load positioned on the torso according to a value measured by the force sensor, wherein the value measured by the force sensor comprises supporting force and torque of the torso that act on the load;
instructions for calculating, through a feedback control law, a desired posture of the torso required for the robot to keep a balance of the load according to the current position and the current velocity of the load, wherein the feedback control law is constructed by: using a Lagrangian equation satisfied by the load on the torso to solve a relationship between a posture of the torso and an acceleration of the load;
instructions for determining an expected position of the virtual joints according to the desired posture of the torso, and calculating, using a full dynamics control algorithm of the robot, a joint torque for each of the real joints of the robot according to the expected position of the virtual joints; and
instructions for transmitting the calculated joint torques to actuators of the corresponding real joints, and controlling, by the actuators of the corresponding real joints, the corresponding real joints to move according to the calculated joint torque, so that the torso is moved to reach the desired posture by moving the corresponding real joints.

11. The robot of claim 10, wherein an end of the force sensor is coupled to a plate for placing the load, and an opposite end of the force sensor is coupled to the torso of the robot, and the instructions for calculating the current position and the current velocity of the load positioned on the torso according to the value measured by the force sensor comprise:
instructions for calculating, through a corresponding equation, the current position of the load on the plate according to a supporting force and torque exerted on the load by the torso measured by the force sensor, and obtaining the current velocity of the load by differentiating the current position; wherein the equation is:

$$x_b = \frac{\tau_y}{F_{pz}}; \text{ and}$$
$$y_b = \frac{\tau_x}{F_{pz}};$$

where, $(x_b, y_b)$ represents a position coordinate of the load on an x-y plane of a torso coordinate system, and $\tau_x$ represents a torque exerted on the load in an x-axis direction of the torso coordinate system, $\tau_y$ represents a torque exerted on the load in a y-axis direction of the torso coordinate system, and $F_{pz}$ represents the supporting force exerted on the load in a z-axis direction of the torso coordinate system.

12. The robot of claim 10, wherein the feedback control law is constructed by:
constructing the Lagrangian equation using a kinetic energy and potential energy equation satisfied by the position and the velocity of the load on the torso;
obtaining a linear relationship between the posture of the torso and an acceleration of the load by calculating a partial derivative of a position and velocity in the Lagrangian equation to obtain an equation to substitute into the Lagrangian equation; and determining a linear feedback control law between the posture of the torso and the position and the velocity of the load based on the linear relationship.

13. The robot of claim 10, wherein the feedback control law includes equations of:

$$\alpha = K_p(x_{b_{ref}} - x_b) + K_d(\dot{x}_{b_{ref}} - \dot{x}_b); \text{ and}$$

$$\beta = -K_p(y_{b_{ref}} - y_b) + K_d(\dot{y}_{b_{ref}} - \dot{y}_b);$$

where, $\alpha$ and $\beta$ represent the posture of the torso, $\alpha$ is an included angle between the torso and an x-z plane in the torso coordinate system, and $\beta$ is an included angle between the torso and a y-z plane in the torso coordinate system; $x_{b_{ref}}$ and $y_{b_{ref}}$ represent expected positions of the load on the torso, and $\dot{x}_{b_{ref}}$ and $\dot{y}_{b_{ref}}$ represent expected velocities of the load on the torso; $x_b$ and $y_b$ represent a current position of the load on the torso, and $\dot{x}_b$ and $\dot{y}_b$ represent a current velocity of the load on the torso; and $K_p$ and $K_d$ are preset ratio coefficients.

14. The robot of claim 10, wherein the instructions for determining the expected position of the virtual joints according to the desired posture of the torso, and calculating, using the full dynamics control algorithm of the robot, the joint torque for each of the real joints of the robot according to the expected position of the virtual joints comprise:

instructions for calculating an expected velocity and expected acceleration of each of the virtual joints based on the expected position of the virtual joint;

instructions for obtaining an optimal solution by solving an optimization model with accelerations of generalized joints of the robot and sole forces of the legs of the robot as optimization variables based on the expected position, the expected velocity and the expected acceleration of each of the virtual joints, wherein constraints of the optimization model include a dynamics equation satisfied by the accelerations of the generalized joints and the sole forces, a friction cone constraint inequality of the sole forces, and a constraint inequality of the joint torque of the real joints, wherein the sole force is a force upon an undersurface of a foot of the robot; and instructions for solving the joint torque for each of the real joints according to the optimal solution and a dynamics equation satisfied by the real joint.

15. The robot of claim 14, wherein the generalized joints include the virtual joints and the real joints, and the torso is taken as a floating base of the robot, and the dynamics equations satisfied by the accelerations of the generalized joints and the sole forces includes:

a dynamics equation satisfied by the accelerations of the virtual joints and the sole forces, and a dynamics equation satisfied by the accelerations of the real joints and the sole forces.

16. The robot of claim 14, wherein the friction cone constraint inequality of the sole forces is constructed by:

constructing a supporting force constriction of the sole force of a supporting leg among the legs of the robot in a gravity direction and friction cone constraints of the sole forces of the supporting leg in two other directions perpendicular to the gravity direction;

describing the sole force of a swinging leg among the legs of the robot as zero in the gravity direction and in the two other directions by means of inequality constraints; and constructing the friction cone constraint inequality of the sole forces based on the supporting force constriction and the friction cone constraint of the supporting leg and an equation constraint of the swinging leg.

17. The robot of claim 14, wherein the constraint inequality of the joint torque of the real joints is constructed by:

decomposing, through a corresponding selection matrix, a joint dynamics equation satisfied by the accelerations of the real joints and the sole forces from the dynamics equations satisfied by the accelerations of the general joints and the sole forces;

obtaining an equation of the joint torque of the real joints by transforming the joint dynamics equation; and constructing the constraint inequality of the joint torque of the real joints based on the equation of the joint torque of the real joints and the joint torque output by each of the real joints not exceeding a maximum joint torque.

18. The method of claim 14, wherein the optimization model is constructed using a standard type quadratic optimization function, and the optimization model is as equations of:

$$\min_X \frac{1}{2} X^T H X + X^T h; \text{ and}$$

$$\text{s.t. } lb \le CX \le ub;$$

wherein, $$H = A^T A;$$

$$h = -A^T b;$$

$$C = \begin{bmatrix} C_e \\ C_r \end{bmatrix}, \text{ where } C_r = \begin{bmatrix} C_{r1} \\ C_{r2} \end{bmatrix};$$

$$lb = \begin{bmatrix} lb_e \\ lb_r \end{bmatrix}, \text{ where } lb_r = \begin{bmatrix} lb_{r1} \\ lb_{r2} \end{bmatrix}; \text{ and}$$

$$ub = \begin{bmatrix} ub_e \\ ub_r \end{bmatrix}, \text{ where } ub_r = \begin{bmatrix} ub_{r1} \\ ub_{r2} \end{bmatrix};$$

where, A and b are coefficient matrices of the optimization model that are determined by a task of the robot for controlling the posture of the torso;

H and h are intermediate variables; X is the optimization variable composed of the accelerations of the general joints and the sole forces; C represents a constraint matrix, $C_e$ represents an equality constraint matrix, and $C_r$ represents an inequality constraint matrix; lb represents a lower bound of constraint, ub represents an upper bound of constraint, $lb_e$ represents a lower bound of equality constraint, $ub_e$ represents an upper bound of equality constraint, $lb_r$ represents a lower bound of inequality constraint, and $ub_r$ represents an upper bound of inequality constraint; and $C_e$, $lb_e$ and $ub_e$ are determined according to the dynamics equation satisfied by the accelerations of the general joints and the sole forces, $C_{r1}$, $lb_{r1}$ and $ub_{r1}$, are determined according to the friction cone constraint inequality of the sole forces, and $C_{r2}$, $lb_{r2}$ and $ub_{r2}$ are determined according to the constraint inequality of the joint torque of the real joints.

19. A non-transitory computer-readable storage medium for storing one or more computer programs executable on a processor, wherein the one or more computer programs comprise:

instructions for calculating a current position and a current velocity of a load positioned on a torso of a multi-legged robot according to a value measured by a force sensor; wherein the robot has a plurality of legs each coupling to the torso and having one or more real joints; wherein the force sensor is disposed on the torso, and states of the torso are described by motions of a plurality of virtual joints constructed between the torso and an origin of a world coordinate system, and wherein the value measured by the force sensor comprises supporting force and torque of the torso that act on the load;

instructions for calculating, through a feedback control law, a desired posture of the torso required for the robot to keep a balance of the load according to the current position and the current velocity of the load, wherein the feedback control law is constructed by: using a Lagrangian equation satisfied by the load on the torso to solve a relationship between a posture of the torso and an acceleration of the load;

instructions for determining an expected position of the virtual joints according to the desired posture of the torso, and calculating, using a full dynamics control algorithm of the robot, a joint torque for each of the real joints of the robot according to the expected position of the virtual joints; and instructions for transmitting the calculated joint torques to actuators of the corresponding real joints, and controlling, by the actuators of the corresponding real joints, the corresponding real joints to move according to the calculated joint torque, so that the torso is moved to reach the desired posture by moving the corresponding real joints.

20. The storage medium of claim 19, wherein an end of the force sensor is coupled to a plate for placing the load, and an opposite end of the force sensor is coupled to the torso of the robot, and the instructions for calculating the current position and the current velocity of the load positioned on the torso according to the value measured by the force sensor comprise:

instructions for calculating, through a corresponding equation, the current position of the load on the plate according to a supporting force and torque exerted on the load by the torso measured by the force sensor, and obtaining the current velocity of the load by differentiating the current position; wherein the equation is:

$$x_b = \frac{\tau_y}{F_{pz}}; \text{ and}$$

$$y_b = \frac{\tau_x}{F_{pz}};$$

where, $(x_b, y_b)$ represents a position coordinate of the load on an x-y plane of a torso coordinate system, and $\tau_y$ represents a torque exerted on the load in an x-axis direction of the torso coordinate system, $\tau_y$ represents a torque exerted on the load in a y-axis direction of the torso coordinate system, and $F_{pz}$ represents the supporting force exerted on the load in a z-axis direction of the torso coordinate system.

* * * * *